United States Patent [19]
Ogo et al.

[11] 3,850,629
[45] Nov. 26, 1974

[54] PHOTOSENSITIVE MATERIALS IN ELECTROPHOTOGRAPHY

[75] Inventors: Shinichi Ogo; Yoshiki Hayashi, both of Osaka, Japan

[73] Assignee: Matsushita Electric Industrial Co., Ltd., Osaka, Japan

[22] Filed: Oct. 3, 1972

[21] Appl. No.: 294,591

[30] Foreign Application Priority Data
Oct. 6, 1971  Japan.............................. 46-79053

[52] U.S. Cl................................. 96/1.5, 260/88.3
[51] Int. Cl............................ G03g 5/04, G03g 7/00
[58] Field of Search....................... 96/1.5; 260/88.3

[56] References Cited
UNITED STATES PATENTS
| | | | |
|---|---|---|---|
| 3,421,891 | 1/1969 | Inami et al............................ | 96/1.5 |
| 3,485,624 | 12/1969 | Thiebant et al....................... | 96/1.5 |
| 3,573,906 | 4/1971 | Goffe................................... | 96/1.8 |
| 3,697,266 | 10/1972 | Ono et al............................. | 96/1.5 |

Primary Examiner—Ronald H. Smith
Assistant Examiner—J. P. Brammer
Attorney, Agent, or Firm—Wenderoth, Lind & Ponack

[57] ABSTRACT

Improved photosensitive polyvinylcarbazole compositions with excellent flexibility, strength, light-decay speed and residual potential characteristics are obtained by combining an isocyanate with a photoconductive insulating polyvinylcarbazole, and inactive additives such as a plasticizer and a binder.

6 Claims, 3 Drawing Figures

PHOTOSENSITIVE MATERIALS IN ELECTROPHOTOGRAPHY

This invention relates to a photosensitive material for use in electrophotography. More specifically, this invention relates to an improved photoconductive insulating layer of polyvinyl carbazole or its derivative for use in an electrophotographic plate.

The polyvinyl carbazole or its derivative (hereinafter conveniently called "polyvinyl carbazole") referred to herein is designated as a polymer of vinyl carbazole and/or its derivative, or a copolymer of N-vinyl carbazole or its derivative and another vinyl compound, such as vinyl acetate and methyl methacrylate. The derivative referred to herein has a substituent, such as a halogen atom, nitro radical, alkyl radical, aryl radical, alkyl aryl radical, amino radical or alkylamino radical, in place of a hydrogen atom in carbazole ring in the recurring unit of the above mentioned polymers as shown in the following chemical formula:

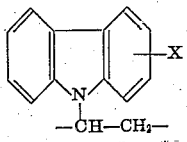

wherein X is the substituent. The number and position of said substituents in the carbazole ring and the polymerization degree of the resultant polymer are determined by their method preparation and are not limited to those expressly disclosed herein.

It is known that the polyvinyl carbazole is a strong electron-doning substance. It is also known that the polyvinyl carbazole can be applied to a conductive substrate to form a film layer in dry thickness of about $0.5$–$50\mu$, which is utilized as an electrophotographic photosensitive material. It is still also known that such a layer of polyvinyl carbazole is inherently photosensitive to the near ultraviolet region (about $300$–$450\mu$) and can be extended to be photosensitive in the visible ray region in accordance with the following two sensitisation methods:

1. An active additive such as Lewis acid (i.e.: Electron-accepting substance) and/or a sensitizing dye is added to a coating solution of polyvinyl carbazole as described in the U.S. Pat. No. 3,037,861.
2. The polyvinyl carbazole layer is combined with a thin photosensitizing layer of a photoconductive insulating material which is highly sensitive in the visible ray region, such as a layer comprising amorphous selenium (about $0.05$–$3\mu$ in thickness), as described in the U.S. Pat. No. 3,573,906 and copending U.S. Pat. application Ser. No. 889,118 now U.S. Pat. No. 3,725,058.

The second method does not necessarily require that the polyvinyl carbazole layer contain a Lewis acid and/or a sensitizing dye because the polyvinyl carbazole layer is optically sensitized by said thin photosensitizing layer, for example, by the selenium layer intimately attaching thereto.

An electrophotographic photosensitive plate made by the above two methods can be essentially light transmissive, flexible and highly charge-acceptable, since the plate utilizes said polyvinyl carbazole layer of transparency, flexibility and high dark-resistivity.

The transparent and/or flexible photosensitive plate can be advantageously used not only for the common office copying machine but for an electrophotographic microfilm and a reflex exposure system in which light passes through the photoconductive insulating layer.

It has been known in the prior art that the plain polyvinyl carbazole layer is very brittle and must be combined with some inactive additives such as some plasticizers and binders to make a mechanically tough and a flexible photosensitive layer. Known plasticizers are, for example, chlorinated diphenyl, epoxy resin, dioctyl phthalate and tricresyl phosphate. Known binders are, for example, polycarbonate and cyanoethyl cellulose. Said plasticizer and binder can be mixed homogeneously with the polyvinyl carbazole and the final film layer is essentially flexible and can be put to practical use as a belt type photosensitive plate in a commercial copying machine in view of the mechanical toughness of said layer.

The addition of said inactive addditives such as plasticizer and binder, however, is disadvantageous with respect to the electrophotographic characteristics (e.g., light decay rate and residual potential) of the polyvinyl carbazole because the photoconductive insulating carbazole molecules are diluted with said inactive additives. By increasing the amounts of said inactive additives, the light-decay speed and the residual potential of the polyvinyl carbazole layer decreases and increases, respectively.

Accordingly, an object of the present invention is to provide a photoconductive insulating layer of polyvinyl carbazole and inactive additives which is flexible and tough but has the same light-decay rate and residual potential as plain polyvinyl carbazole. A further object of the present invention is to provide a material composed of an improved polyvinyl carbazole layer which is flexible and tough but has the same light decay rate and residual potential as plain polyvinyl carbazole.

These and other objects of this invention will be apparent upon consideration of the following detailed description taken together with the accompanying drawings wherein.

A photosensitive material for use in electrophotography according to the present invention comprises, as a main ingredient, photoconductive insulating polyvinyl carbazole combined with some inactive additive materials and further, as an active additive ingredient, an isocyanate compound.

It has been discovered according to the present invention that the use of said isocyanate compound improves the light-decay characteristic of polyvinyl carbazole combined with some inactive additives such as a plasticizer and/or a binding material. Thus, the inactive additives would normally be active and materially effect the photosensitivity of the polyvinyl carbazole layer in the absence of the isocyanate.

The isocyanate compound according to the present invention has the general formula:

$$R-N=C=O$$

where R is a substituent, which is, for example, an aromatic group or aromatic-aliphatic group. Among various isocyanate compounds, the operable ones have a low molecular weight and a high compatibility with at least one of the following: the polyvinylcarbazole, plasticizer and binding material. The examples of the operable compounds are:

$CH_3CH_2NCO$, $C_6H_4CH_3NCO$, $C_{10}H_7NCO$, $C_6H_5NCO$, $OCN(CH_2)_2NCO$, $OCN(CH_2)_3NCO$, $OCNCH_2 \cdot CH \cdot CH \cdot CH_2NCO$, $OCN(CH_2)_4NCO$, $OCN(CH_2)_5NCO$, $OCN(CH_2)_5NCO$, $OCN(CH_2)_6NCO$, $C_6H_4(CH_2NCO)_2$, $C_6H_{10}(CH_2NCO)_2$, $C_6H_4(CH_2CH_2NCO)_2$, $C_{10}H_6(CH_2NCO)_2$, $(CH_3)_2C_6H_8(CH_2NCO)(CH_2)_3NCO$, $OCN(CH_2)_3C_6H_4C_6H_4(CH_2)_3NCO$, $C_6H_4(NCO)_2$, $CH_3C_6H_3(NCO)_2$, $(CH_3)_2C_6H_2(NCO)_2$, $H_5C_2C_6H_3(NCO)_2$, $(C_2H_5)_2C_6H_2(NCO)_2$, $C_{10}H_6(NCO)_2$, $OCNC_{10}H_6C_{10}H_6NCO$, $OCNC_6H_4C_6H_4NCO$, $[OCN(CH_3)C_6H_3]_2$, $[OCN(OCH_3)C_6H_3]_2$, $H_2C[C_6H_4NCO]_2$, $OCNC_6H_4(CH_2C_6H_4NCO)_nCH_2C_6H_4NCO$ (n=1,2, ...), $H_2C[C_6H_3(CH_3)NCO]_2$, $(H_3C)_2C[C_6H_4NCO]_2$, $H_2C[C_6H_2(CH_3)_2NCO]_2$, $C_6H_{10}CH[C_6H_4NCO]_2$, $H_2C[C_6H_3(OCH_3)NCO]_2$, $H_2C[C_6H_3(OC_2H_5)NCO]_2$, $H_2C[C_6H_2(OCH_3)CH_3NCO]_2$, $(H_3C)_2C(C_6H_3Cl NCO)_2$, $OC(C_6H_4NCO)_2$, $C_6H_5CH_2CH_2C_6H_3(NCO)_2$, $NO_2 \ C_6H_4CH(C_6H_4NCO)_2$, $H_3CC_6H_2(NCO)_3$, $(CH_3)_3C_6(NCO)_3$, $C_{10}H_5(NCO)_3$, $OCNC_6H_4 \cdot C_6H_3(NCO)_2$, $OCNC_6H_4CH_2C_6H_3(NCO)_2$, $OCNC_6H_4CH_2C_6H_2(CH_3)(NCO)_2$, $[OCNC_6H_4]_3CH$, $S \cdot P(OC_6H_4NCO)_3$. Among them, the preferable compounds are $H_3CC_6H_3(NCO)_2$ (toluylene diisocyanate) $OCNC_6H_4CH_2C_6H_4NCO$ (diphenylmethan diisocyanate) $OCNC_6H_4(CH_2C_6H_4NCO)_nCH_2C_6H_4NCO$ [$OCNC_6H_4$]CH (triphenylmethan triisocyanate) $S \cdot P(OC_6H_4NCO)_3$ (thiophosphoric acid tris < p-isocyanate phenylester >).

Figure 1:
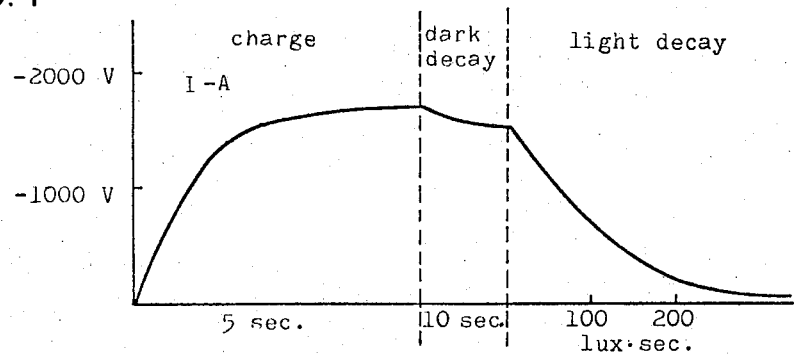
FIG. 1 shows a comparison between the electrophotographic characteristics (charging-dark decay-light decay) of the 2-methyl anthraquinone-sensitized-polyvinyl carbazole layer of prior art and of this invention.
Figure 1:
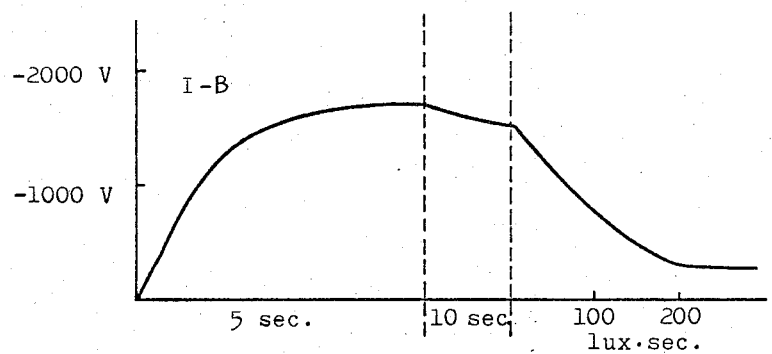
Figure 1:
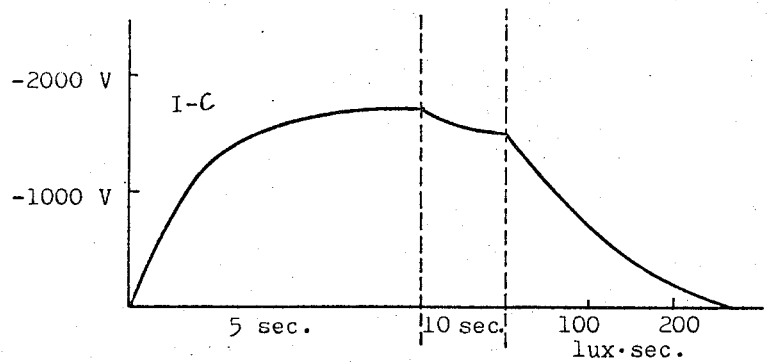

The improvement of the light-decay curve of said polyvinyl carbazole will be explained with reference to, for example, FIG. 1. A light-decay curve 1A is obtained with a photosensitive material consisting of 100 weight parts of plain polyvinyl carbazole and 10 weight parts of, as an active additive, 2-methyl anthraquinone which serves as an electron-acceptor type sensitizer for said polyvinyl carbazole. The photosensitive material corresponding to the light-decay curve 1A has poor mechanical properties, such as cracking and crazing. The mechanical properties are improved by adding 40 weight parts of polycarbonate to the photosensitive material corresponding to curve 1A. The photosensitive material including polycarbonate, however, shows a somewhat lower light-decay rate in the light-decay curve than that of the light-decay curve 1A and remains at a residual potential even when exposed to a high light energy as shown in curve 1B. An addition of 10 weight parts of diphenylmethane diisocyanate to the photosensitive material of curve 1B improves both mechanical properties and light-decay rate and has no residual potential when exposed to a light energy of 300 lux-second, as shown in curve 1C.

The effect of said isocyanate compound on a light-decay curve of said polyvinyl carbazole is much emphasized when said polyvinyl carbazole is combined with an amorphous selenium layer for achievement of reusable photosensitive material used in an electrophotographic copying plate. The preparation methods for said polyvinyl carbazole-amorphous selenium-multilayered plates for electrophotography are precisely described in the foregoing mentioned U.S. Pat. No. 3,573,906 and copending U.S. Pat. application Ser. No. 889,118.

Figure 2:
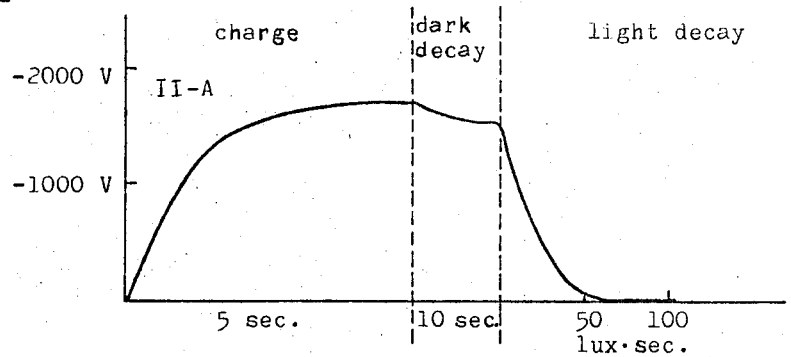
FIG. 2 shows a comparison between the electrophotographic characteristics of selenium-sensitized polyvinyl carbazole layer of prior art and of this invention.
Figure 2:
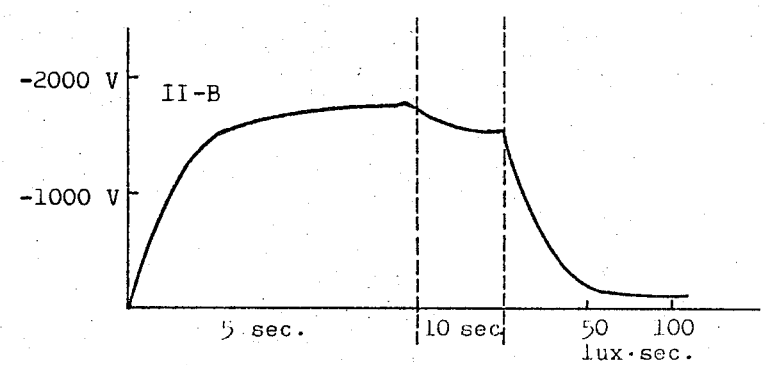
Figure 2:
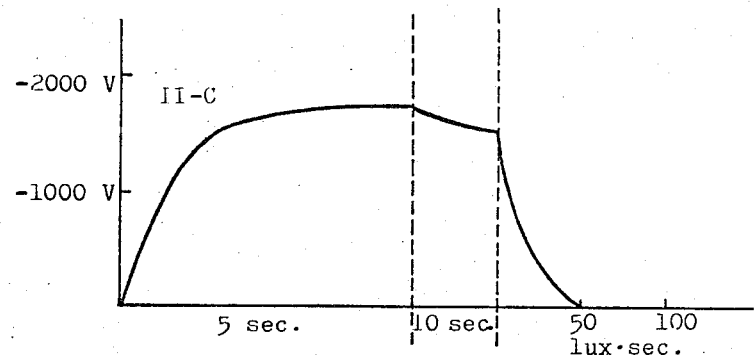

FIG. 2-A shows a light-decay curve of a photosensitive material which comprises a top plain polyvinyl carbazole and, as a second layer, an amorphous selenium layer of about 0.3 micron in thickness. The photosensitive material corresponding to the light-decay curve 11A shows an ideal light-decay curve.

As a typical experiment for describing the effectiveness of said isocyanate compound in the above cases, two kinds of multilayered reusable photosensitive materials are prepared for comparison: One has a top layer of 100 weight parts of polyvinyl carbazole and 40 weight parts of polycarbonate and, as a second layer, an amorphous selenium layer of about 0.3 micron in thickness. Another has a top layer of 100 weight parts of polyvinyl carbazole, 40 weight parts of polycarbonate and 10 weight parts of diphenylmethane diisocyanate and an amorphous selenium layer of 0.3 micron in thickness. FIG. 2-B and 2-C show the light-decay curves of the former and the latter photosensitive materials, respectively. It is self-evident that the curve II-B is poorer than the curve II-C. When the former material (corresponding to curve II-B) is used repeatedly, i.e., more than 1000 times by Carlson's method, it shows decreased photosensitivity and increased residual potential, which results in a poor reproduced image having background fog. On the other hand, the latter material (corresponding to curve II-C) has no change in photosensitivity and no perceptible residual potential, similar to that of the light-decay curve II-C, even after 1000 times of use.

The reason why the photosensitivity and the residual potential are improved by adding an isocyanate compound to the polyvinyl carbazole layer is not clearly understood, however, it is assumed that interlayer contact between the polyvinyl carbazole-isocyanate layer and the conductive layer or selenium layer might be sufficiently intimate so as to suppress the generation of space charges in the interlayer, in spite of the presence of inactive additives in said polyvinyl carbazole-isocyanate layer.

An operable amount of said isocyanate compound is less than 30 weight parts relative to 100 weight parts of said polyvinyl carbazole. The use of said isocyanate compound at more than 30 weight parts not only increases the brittleness but also lowers photosensitivity or increases the residual potential of the resulting photosensitive material. A preferable amount of said isocyanate compound ranges from 5 to 20 weight parts relative to 100 weight parts of said polyvinyl carbazole.

The inactive binding material is employed to improve the film-forming characteristics of polyvinyl carbazole and may be composed of any available and suitable material having a high compatibility with the polyvinylcarbazole, such as polycarbonate and cyanoethyl cellulose. The most suitable binding material is polycarbonate. The inactive plasticizer is employed to improve the flexibility of polyvinyl carbazole combined with the binding material and may be composed of any availabe and suitable material having a high compatibility with the polyvinyl carbazole. The most suitable plasticizers are terphenyl, diphenyl chloride, chlorinated naphthalene, and epoxy resin. Further inactive additive such as silicon oil and a fluorocarbon oil can be added to the polyvinyl carbazole in order to make a smooth surface in said layer. As the addition amount of the inactive additives decreases, the resultant material exhibits better photoconductivity but worse mechanical properties. Therefore, the addition amount of said inactive additives such as plasticizer, binding material and smoothing material may be selected with a view to controlling mechanical properties and photoconductivity of resultant material. However, the maximum amount of the inactive additives addable to the polyvinylcarbazole is limited by the compatibility of the additives with the polyvinylcarbazole. The total amount of the inactive additives is preferably less than 200 weight parts relative to said polyvinyl carbazole according to the present invention.

An electrophotographic material, including the novel photosensitive material according to the present invention, can be prepared by a per se well known technique. A mixture of aforesaid polyvinyl carbazole, binding material and plasticizer is dissolved in a solvent which is able to dissolve aforesaid isocyanate compound. If necessary, said mixture is admixed with any suitable and available sensitizer.

Operable solvents include benzene, chlorobenzene, methylene chloride, ethylene dichloride, ethylene trichloride, ethlene tetrachloride and tetrahydrofuran, or a mixed solvent thereof.

The aforesaid isocyanate compound is further dissolved in a solution dissolving said mixture. The viscosity of the final solution may be controlled in connection with the film forming technique.

The solution is applied to an electrically conductive base by any suitable and available coating method, such as a doctor blade method, roll coating method, or spray method. The electrically conductive base may be composed of a conductive paper, metal plate or organic film having a conductive metal thin layer coated thereon. An electrically conducting plate having an insulating barrier layer coated thereon is also used as a base. An electrically conducting plate having an amorphous selenium layer vacuum-evaporated thereon is still also used as a base. In this case, a better result can be obtained with a solution containing no sensitizer.

The solution coated on the base is dried by any suitable method and is formed into a photosensitive layer of 0.5 to 50 microns in thickness.

Further, it is operable that the photosensitive layer including the isocyanate compound can be overlaid with a photoconductive insulating layer as described in the U.S. Pat. No. 3,573,906, so as to complete a multilayered plate for use in electrophotography.

The photosensitive layer including the isocyanate compound thus produced is preferably subjected to an aging treatment for improvement of its light-decay curve. The aging treatment is achieved by keeping the photosensitive layer at room temperature for about one week. A higher temperature results in the shorter time period. For example, the aging temperature of 50°C permits an aging period of 2 to 3 days.

Figure 3:
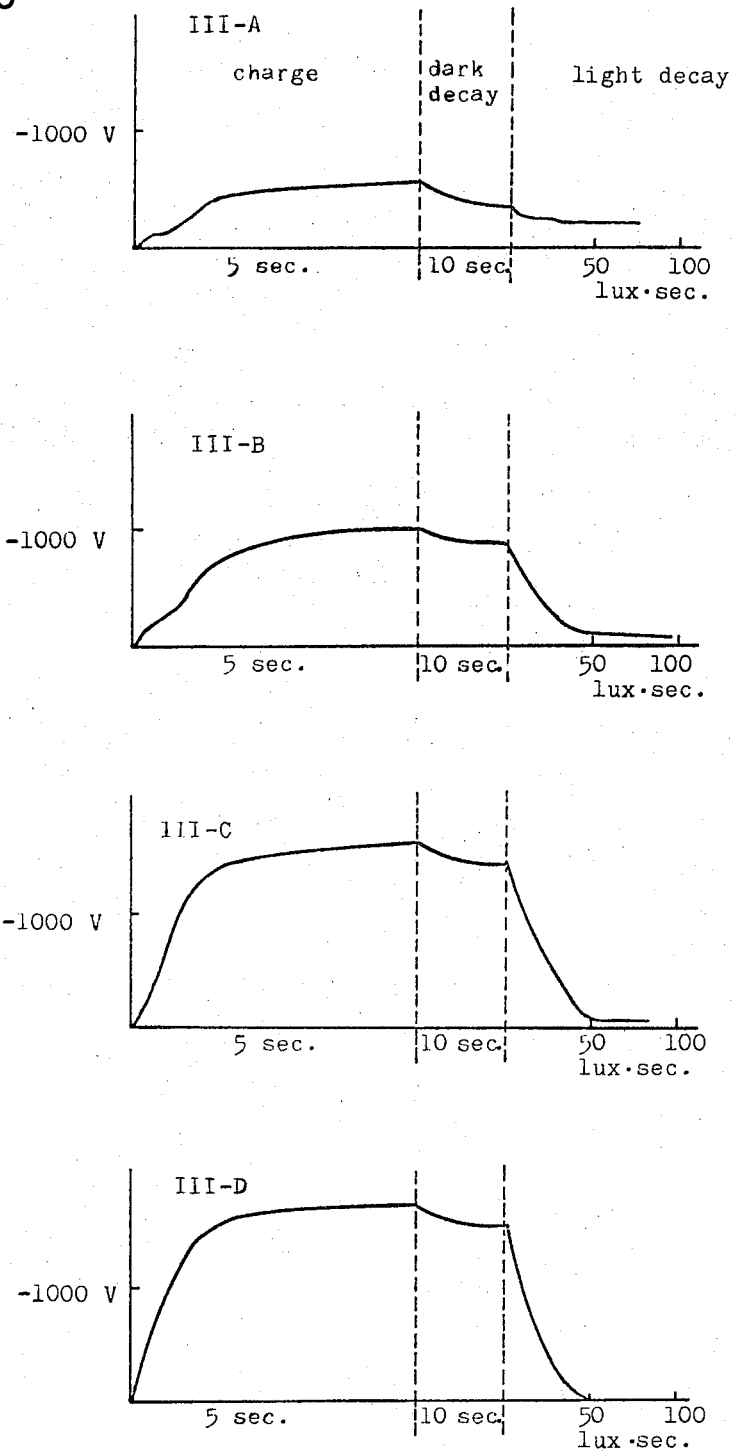
FIG. 3 shows a change of an electrophotographic characteristic of an improved polyvinyl carbazole layer on a selenium layer by aging according to the present invention.

FIG. 3 shows the change of electrophotographic characteristics during aging in the photosensitive layer sample of FIG. 2 at room temperature. Curve III-A, III-B, III-C and III-D correspond to one hour-aged sample, 24 hours-aged sample, 100 hours-aged sample and 200 hours-aged sample, respectively.

The aging effect of photosensitive layer is attributed to a gridge formation between the isocyanate compound and a very slight amount of hydroxyl OH$^-$ in water which may be included in the photosensitive layer. Thus, the interlayer contact of said layer to the adjacent surface (e.g. electrode surface or selenium surface) might be intimate. From the fact, it is suitable to add a small amount of an alcohol or a polyester to aforesaid solution for promotion of the bridge formation. Care should be taken to prevent the solution from being contaminated with water during preparation or storage of the solution.

In addition to the improved light-decay curve, the photosensitive layer according to the present invention advantageously has a high electrical resistance in the dark and can rapidly receive ions under a corona discharging atmosphere.

The high charge-acceptability of the photosensitive layer of the present invention is preferred for the charge transfer copying method, i.e. The TESI method which is described in French Pat. No. 2,024,150 and U.S. Pat. No. 2,825,814.

EXAMPLE 1

A solution consisting of 100g. of polyvinyl carbazole (Luvican M-170, BASF), 10g. of 2-methyl anthraquinone, 40g. of polycarbonate (Panlite, Teijin Co.), 900g. of monochlorobenzene and 300g. of dichloroethane was prepared by mixing them homogeneously in a flask at 80°C, 3 hours. After the solution was cooled, 10g. of toluylene diisocyanate (Desmodur T-80, Nippon Polyurethane Co.) was further added and homogeneously mixed.

The final solution was then applied to a CuI-superposed polyethylene terephthalate film and dried (dried thickness; 10$\mu$) so as to make an electrophotographic photosensitive transparency.

After the transparency was aged for a week, the light-decay characteristic at negative potential did not show any residual potential by intense exposure of 300 lux.-sec.

EXAMPLE 2

A solution consisting of 100g. of brominated polyvinyl carbazole, 0.05g. of crystal violet, 10g. of 2-methylanthraquinone, 30g. of polycarbonate (lupilon S-1000, Mitsubishi-Edogawa Chemical Co.), 20g. of epoxy resin (Epikote 828, Shell Chemical Co.), 1200g. of monochlorobenzene and 20g. of an isocyanate compound (Vulcabond TX, ICI) was prepared by mixing them homogeneously at 60°C, 3 hours.

The final solution was then applied to a CuI-superposed polyethylene terephthalate film and dried (dried thickness, 15$\mu$) so as to make an electrophotographic photosensitive transparency.

After the transparency was aged for a week, it was noted that the characteristic of charge-dark decay-light decay at negative potential did not show any residual potential with an intense exposure more than 200 lux.-sec.

EXAMPLE 3

A solution consisting of 100g. of polyvinyl carbazole (Luvican M-170, BASF), 40g. of polycarbonate (Panlite L-1250, Teijin Co.), 950g. of monochlorobenzene and 320g. of dichloroethane was prepared by mixing them homogeneously at 80°C, 3 hours. After the solution was cooled to room temperature, 20g. of diphenylmethane diisocyanate (Millionate MR. Nippon Polyurethane Co.) and 30g. of chlorinated diphenyl were simultaneously added to the solution and homogeneously mixed.

The final solution thus produced was applied to a thin amorphous selenium layer of 0.3μ in thickness which was vacuum deposited on an aluminized polyethylene terephthalate film of 75μ in thickness (Metalumy film, Toray Co.) by knife coating, then dried (dried thickness, 15μ) to form a final photosensitive film. After the photosensitive film was aged for 1 week at room temperature, the characteristic of charge-dark decay-light decay of the film at negative potential did not show any residual potential with an intense exposure of 50 lux.-sec.

Through a shuttle test of charge-dark decay-light decay cycle of about 3000 times, the electrophotographic characteristic of the film (i.e.: charge accepting rate, dark-decay rate and light-decay rate) in every cycle did not show even a slight change.

EXAMPLE 4

A solution consisting of 100g. of brominated polyvinyl carbazole, 40g. of polycarbonate (Iupilon S-1000, Mitsubishi-Edogawa Chemical Co.), 20g. of epoxy resin (Epikote 828, Shell Chemical Co.), 20g. of diphenyl chloride 950g. of monochlorobenzene and 320g. dichloroethane was prepared by mixing them homogeneously in a flask at 80°C, 3 hours. After the solution was cooled, 10g. of an isocyanate compound (Desmodur VL, Bayer) was further added and homogeneously mixed.

The final solution was then applied to a thin amorphous selenium layer of 0.3μ in thickness which was vacuum-deposited on an aluminized polyethylene terephthalate film of 75μ in thickness (Metalumy film, Toray Co.) by knife coating, then dried (dried thickness, 15μ) to form a photosensitive film.

After the photosensitive film was aged for one week, the characteristic of charge-dark decay-light decay of the film at negative potential did not shown any residual potential with an intense exposure of 50 lux.sec.

Through a shuttle test of charge-dark decay-light decay cycle of about 3000 times, the electrophotographic characteristic of the film in every cycle did not show even slight change.

EXAMPLE 5

A solution consisting of 100g. of polyvinyl carbazole, 40g. of polycarbonate (Iupilon S-1000, Mitsubishi Edogawa Chemical Co.), 20g. of epoxy resin (Epikote 828, Shell Chemical Co.), 50g. of chlorinated naphthalene (m.p. 120°C, Cl content: 58 percent), 950g. of monochlorobenzene and 320g. of dichloroethane was prepared by mixing them homogeneously in a flask at 80°C, 3 hours.

After the solution was cooled, 10g. of an isocyanate compound (Desmodur VL, Bayer) was further added and homogeneously mixed The final solution was then applied by a knife blade to an aluminum plate which was carefully cleaned. The dried thickness of the coating was 10μ. On the coating, an amorphous selenium layer of 0.3μ was further superimposed by the vacuum-evaporation method to complete electrophotographic photosensitive plate A.

After the plate A was aged for a week, the light-decay characteristics at positive potential did not show any residual potential after an intense exposure of 100 lux.-sec.

For comparison, an electrophotographic photosensitive plate B comprising from the bottom up, an aluminum plate, an organic photoconductive layer comprising 100g. of polyvinyl carbazole, 40g. of polycarbonate, 20g. of epoxy resin, and 20g. of diphenyl chloride and an amorphous selenium layer was prepared.

The method of preparation, the thickness of the layers and the raw materials used were substantially the same as in plate A.

The light-decay curve of the plate B showed a residual potential of about positive 100V even after an intense light exposure of 200 lux.sec. was applied to the plate.

The embodiments of the invention in which exclusive property or privilege is claimed are defined as follows:

1. A photosensitive material for use in a layer of an electrophotographic plate comprising:
   a. a photoconductive insulating polyvinyl carbazole having a recurring unit of the formula:

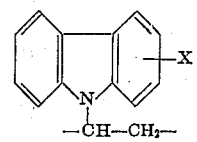

wherein X is hydrogen, halogen, nitro, alkyl, aryl, alkyl aryl, amino or alkylamino;
   b. an isocyanate present in at least 5 but less than 30 parts by weight per 100 parts by weight of said polyvinyl carbazole and
   c. an additive selected from the group consisting of plasticizers, binders or both.

2. A photosensitive material for use in a layer of an electrophotographic plate defined by claim 1, wherein said isocyanate compound has a low molecular weight and higher compatibility with at least one of polyvinylcarbazole, plasticizer and binder.

3. A photosensitive material for use in a layer of an electrophotographic plate defined by claim 1, wherein said isocyanate compound is a member selected from the group consisting of — $H_3CC_6H_3$ — $(NCO)_2$ — $OCNC_6H_4(CH_2C_6H_3NCO)_nCH_2C_6H_4NCO$ $CH_2C_6H_4NCO$ (n=1, 2, ...), $[OCNC_6H_4]_3CH$ and $S \cdot P \cdot (OC_6H_4NCO)_3$.

4. A photosensitive material for use in a layer of an electrophotographic plate defined by claim 1, wherein said plasticizer, binder or both includes a member selected from the group consisting of polycarbonate, diphenyl chloride, terphenyl, chlorinated naphthalene, and epoxy resin.

5. A photosensitive material for use in electrophotography defined by claim 3, wherein said isocyanate compound is combined with one member selected from the group consisting of alcohol and ester.

6. A photosensitive material for use in electrophotography defined by claim 1 wherein the total amount of component c) is less than 200 weight parts based on the weight of said polyvinyl carbazole.

* * * * *